United States Patent
Nordholt et al.

(10) Patent No.: US 9,287,994 B2
(45) Date of Patent: Mar. 15, 2016

(54) GREAT CIRCLE SOLUTION TO POLARIZATION-BASED QUANTUM COMMUNICATION (QC) IN OPTICAL FIBER

(75) Inventors: Jane Elizabeth Nordholt, Los Alamos, NM (US); Charles Glen Peterson, Los Alamos, NM (US); Raymond Thorson Newell, Santa Fe, NM (US); Richard John Hughes, Los Alamos, NM (US)

(73) Assignee: LOS ALAMOS NATIONAL SECURITY, LLC, Los Alamos, NM (US)

( * ) Notice: Subject to any disclaimer, the term of this patent is extended or adjusted under 35 U.S.C. 154(b) by 583 days.

(21) Appl. No.: 13/600,898

(22) Filed: Aug. 31, 2012

(65) Prior Publication Data

US 2013/0084079 A1    Apr. 4, 2013

Related U.S. Application Data

(60) Provisional application No. 61/541,666, filed on Sep. 30, 2011.

(51) Int. Cl.
*H04B 10/06* (2006.01)
*H04B 10/70* (2013.01)
*H04K 1/08* (2006.01)

(52) U.S. Cl.
CPC . *H04B 10/70* (2013.01); *H04K 1/08* (2013.01)

(58) Field of Classification Search
CPC .... H04B 10/70; H04B 10/532; H04B 10/548; H04B 10/615; H04B 10/6151; H04L 9/0852; H04L 9/0827; H04L 9/0833
USPC ........... 398/184, 152, 65, 183, 188, 202, 205, 398/208, 209, 204, 206, 207, 141, 140, 158, 398/159; 380/256, 279, 278, 283, 44
See application file for complete search history.

(56) References Cited

U.S. PATENT DOCUMENTS

| 5,966,224 A | 10/1999 | Hughes et al. |
| 6,263,435 B1 | 7/2001 | Dondeti et al. |

(Continued)

FOREIGN PATENT DOCUMENTS

| CN | 101599826 | 12/2009 |
| EP | 2081317 | 7/2009 |

(Continued)

OTHER PUBLICATIONS

Alleaume et al. "SECOQC White Paper on Quantum Key Distribution and Cryptography," *SECOQC*, 28 pp. (Jan. 2007).

(Continued)

*Primary Examiner* — Hanh Phan
(74) *Attorney, Agent, or Firm* — Wilmer Cutler Pickering Hale and Dorr LLP

(57) ABSTRACT

Birefringence in optical fibers is compensated by applying polarization modulation at a receiver. Polarization modulation is applied so that a transmitted optical signal has states of polarization (SOPs) that are equally spaced on the Poincaré sphere. Fiber birefringence encountered in propagation between a transmitter and a receiver rotates the great circle on the Poincaré sphere that represents the polarization bases used for modulation. By adjusting received polarizations, polarization components of the received optical signal can be directed to corresponding detectors for decoding, regardless of the magnitude and orientation of the fiber birefringence. A transmitter can be configured to transmit in conjugate polarization bases whose SOPs can be represented as equidistant points on a great circle so that the received SOPs are mapped to equidistant points on a great circle and routed to corresponding detectors.

18 Claims, 4 Drawing Sheets

(56) References Cited

U.S. PATENT DOCUMENTS

| | | | |
|---|---|---|---|
| 6,289,104 B1* | 9/2001 | Patterson et al. | 380/283 |
| 6,748,083 B2 | 6/2004 | Hughes et al. | |
| 7,515,716 B1 | 4/2009 | Elliott | |
| 7,587,654 B2 | 9/2009 | Matsumoto | |
| 7,627,126 B1 | 12/2009 | Pikalo et al. | |
| 7,725,026 B2 | 5/2010 | Patel et al. | |
| 8,005,227 B1 | 8/2011 | Linnell et al. | |
| 8,213,620 B1 | 7/2012 | Sussland et al. | |
| 2001/0055389 A1 | 12/2001 | Hughes et al. | |
| 2002/0010857 A1 | 1/2002 | Karthik | |
| 2003/0002768 A1 | 1/2003 | Wood et al. | |
| 2003/0098355 A1 | 5/2003 | Johnson | |
| 2004/0017916 A1 | 1/2004 | Staddon et al. | |
| 2004/0128509 A1 | 7/2004 | Gehrmann | |
| 2005/0036624 A1 | 2/2005 | Kent et al. | |
| 2005/0044356 A1 | 2/2005 | Srivastava et al. | |
| 2005/0135620 A1 | 6/2005 | Kastella et al. | |
| 2005/0141716 A1 | 6/2005 | Kumar | |
| 2006/0056630 A1 | 3/2006 | Zimmer et al. | |
| 2006/0088157 A1 | 4/2006 | Fujii | |
| 2006/0168446 A1 | 7/2006 | Ahonen et al. | |
| 2006/0212936 A1 | 9/2006 | Berzanskis et al. | |
| 2006/0263096 A1 | 11/2006 | Dinu et al. | |
| 2006/0290941 A1* | 12/2006 | Kesler et al. | 356/491 |
| 2007/0177735 A1 | 8/2007 | Mimih et al. | |
| 2007/0192598 A1 | 8/2007 | Troxel et al. | |
| 2007/0211786 A1 | 9/2007 | Shattil | |
| 2007/0223698 A1 | 9/2007 | Tsurumaru | |
| 2007/0280689 A1 | 12/2007 | Boffi et al. | |
| 2008/0031456 A1 | 2/2008 | Harrison et al. | |
| 2008/0144823 A1 | 6/2008 | Abe et al. | |
| 2008/0152147 A1 | 6/2008 | Xia et al. | |
| 2008/0310856 A1* | 12/2008 | Poppe | 398/152 |
| 2009/0022322 A1 | 1/2009 | Trifonov | |
| 2009/0092252 A1 | 4/2009 | Noll et al. | |
| 2009/0110033 A1 | 4/2009 | Shattil | |
| 2009/0150561 A1 | 6/2009 | Vig | |
| 2009/0160670 A1 | 6/2009 | Sipple | |
| 2009/0169015 A1 | 7/2009 | Watanabe | |
| 2009/0175450 A1 | 7/2009 | Brandt | |
| 2009/0175452 A1 | 7/2009 | Gelfond et al. | |
| 2009/0180615 A1 | 7/2009 | Trifonov | |
| 2009/0180616 A1 | 7/2009 | Brodsky et al. | |
| 2009/0180776 A1 | 7/2009 | Brodsky et al. | |
| 2009/0185689 A1 | 7/2009 | Beal | |
| 2009/0190759 A1 | 7/2009 | Peev et al. | |
| 2009/0202074 A1 | 8/2009 | Trifonov et al. | |
| 2009/0240913 A1 | 9/2009 | Obana et al. | |
| 2009/0257755 A1 | 10/2009 | Buelow | |
| 2009/0262942 A1 | 10/2009 | Maeda et al. | |
| 2010/0028024 A1 | 2/2010 | Shpantzer et al. | |
| 2010/0158252 A1* | 6/2010 | Youn et al. | 380/256 |
| 2010/0211787 A1 | 8/2010 | Bukshpun et al. | |
| 2010/0226659 A1 | 9/2010 | Nishioka et al. | |
| 2010/0257434 A1 | 10/2010 | Harrison et al. | |
| 2011/0208971 A1 | 8/2011 | Bhattacharya et al. | |
| 2011/0213979 A1 | 9/2011 | Wiseman et al. | |
| 2012/0177200 A1 | 7/2012 | Harrison et al. | |
| 2012/0177201 A1 | 7/2012 | Ayling et al. | |

FOREIGN PATENT DOCUMENTS

| | | |
|---|---|---|
| KR | 10-0892763 | 4/2009 |
| WO | WO 2007/123869 | 11/2007 |
| WO | WO 2008/015758 | 2/2008 |
| WO | WO 2009/093034 | 7/2009 |
| WO | WO 2009/093036 | 7/2009 |
| WO | WO 2009/093037 | 7/2009 |
| WO | WO 2009/141586 | 11/2009 |
| WO | WO 2009/141587 | 11/2009 |
| WO | WO 2009/145392 | 12/2009 |
| WO | WO 2012/044852 | 4/2012 |
| WO | WO 2012/044855 | 4/2012 |
| WO | WO 2013/048671 | 4/2013 |
| WO | WO 2013/048672 | 4/2013 |
| WO | WO 2013/048674 | 4/2013 |

OTHER PUBLICATIONS

Biham et al., "Quantum Cryptographic Network Based on Quantum Memories," *Physical Review*, vol. 54, No. 4, 8 pp. (1996).

Huang et al., "Quantum Key Distribution Based on Multi-Qubit Hadamard Matrices," *2008 The Fourth International Conference on Information Assurance and Security*, pp. 333-337 (2008).

International Search Report and Written Opinion from International Patent Application No. PCT/US2013/055356, dated May 5, 2014, 7 pp.

AFP-JIJI Press, "Japanese Develop System to Prevent Mobile Phone Tapping," *JIJI Press*, 4 pp., downloaded from the World Wide Web (document marked Sep. 2, 2010).

Arda, "A Quantum Information Science and Technology Roadmap—Part 2: Quantum Cryptography—Report of the Quantum Cryptography Technology Experts Panel," 100 pp. (Jul. 19, 2004).

Barrie, "Defeating Cyber-Attacks with Quantum Cryptography," FoxNews.com, 2 pp. (Mar. 2013).

Becker et al., "Merkle Signature Schemes, Merkle Trees and Their Cryptanalysis," 28 pp. (2008).

Buttler et al., "Free-space Quantum Key Distribution," *Phys. Rev. A*, vol. 57, Issue 4, pp. 2379-2382 (Apr. 1998).

Buttler et al., "Practical Free-space Quantum Key Distribution over 1 km," *Physical Review Letters*, vol. 81, No. 15, pp. 3283-3286 (Oct. 1998).

Chapuran et al., "Optical Networking for Quantum Key Distribution and Quantum Communications," *New Journal of Physics*, vol. 11, 19 pp. (Oct. 2009).

Damgård et al., "Secure Identification and QKD in the Bounded-Quantum-Storage Model," *Proc. 27th Annual Int'l Cryptology Conf. on Advances in Cryptology*, pp. 342-359 (Aug. 2007).

Duligall et al., "Low Cost and Compact Quantum Key Distribution," *New Journal of Physics*, vol. 8, 16 pp. (Oct. 2006).

Federal Information Processing Standard Publication 197, "The Advanced Encryption Standard (AES)," 51 pp. (Nov. 2001).

Federal Information Processing Standard Publication 198, "The Keyed-Hash Message Authentication Code (HMAC)," 20 pp. (Mar. 2002).

Graham-Rowe, "My Name is Bob and I Make E-shopping a Cinch," *New Scientist*, pp. 30-31 (Nov. 2007).

Greenemeier, "Quantum Cryptography Comes to Smart Phones," *Scientific American*, 1 p. (Feb. 2012).

Harrington et al, "Enhancing Practical Security of Quantum Key Distribution with a Few Decoy States," 4 pp. (Mar. 2005).

Hillery et al., "Quantum Secret Sharing," *Physical Review A*, vol. 59, No. 3, pp. 1829-1834 (Mar. 1999).

Hughes et al., "Comment on 'Quantum Key Distribution with 1.25 Gbps Clock Synchronization' by J. C. Bienfang et al., quant-ph/0405097," 4 pp. (Jul. 2004).

Hughes et al., "Free-space Quantum Key Distribution in Daylight," *Journal of Modern Optics*, vol. 47, Issues 2-3, pp. 549-562 (Feb. 2000).

Hughes et al., "Network-Centric Quantum Communications with Application to Critical Infrastructure Protection," LA-UR-13-22718 (version 2), 7 pp. (May 2013).

Hughes et al., "Practical Free-Space Quantum Cryptography," 17 pp. (1998).

Hughes et al., "Practical Free-space Quantum Key Distribution over 10 km in Daylight and at Night," *New Journal of Physics*, vol. 4, pp. 43.1-43.14 (Jul. 2002).

Hughes et al, "Practical Quantum Cryptography for Secure Free-space Communications," 12 pp. (May 1999).

Hughes et al., "Quantum Cryptography over Underground Optical Fibers," *Advances in Cryptology*, 16 pp. (Jul. 1996).

Hughes et al., "Quantum Key Distribution," Los Alamos National Laboratory Physics Division, pp. 193-196 (Apr. 2004).

Hughes et al., "Practical Quantum Key Distribution over a 48-km Optical Fiber Network," LA-UR-99-1593, 13 pp. (1999).

(56) References Cited

OTHER PUBLICATIONS

Hughes et al, "Secure Communications Using Quantum Cryptography," *Proc. SPIE Photonic Quantum Computing*, vol. 3076, pp. 2-11 (Jul. 1997).
ID Quantique SA, "CLAVIS2 Quantum Key Distribution for R&D Applications," 2 pp. (downloaded from the World Wide Web on Sep. 9, 2011).
ID Quantique SA, "Redefining Precision CLAVIS2: The Most Versatile Quantum Key Distribution Research Platform," 4 pp. (document marked Jan. 2010).
ID Quantique SA, "Redefining Security CERBERIS The Best of Classical and Quantum Worlds: Layer 2 Link Encryption with Quantum Key Distribution," 2 pp. (document marked Jan. 2010).
ID Quantique SA, "Separation of Duties: Dedicated vs Integrated Encryption Appliances," White Paper, Version 1.0, 8 pp. (Feb. 2011).
International Search Report dated Nov. 26, 2012, from International Patent Application No. PCT/US2012/053382, 2 pp.
Kunz-Jacques et al., "Using Hash-Based Signatures to Bootstrap Quantum Key Distribution," 9 pp. (Sep. 2011).
Los Alamos National Laboratory, "Quantum Smart Card—QKarD," 1 p., 2013.
Ma et al., "High Speed Quantum Key Distribution Over Optical Fiber Network System," Journal of Research of NIST, vol. 114, No. 3, 29 pp. (May-Jun. 2009).
MagiQ Technologies, Inc., "MAGIQ QPNTM 8505 Security Gateway Uncompromising VPN SecurityTM," 4 pp. (document marked 2007).
Menendez et al., "Network Applications of Cascaded Passive Code Translation for WDM-compatible Spectrally Phase-encoded Optical CDMA," Journal of Lightwave Technology, vol. 23, No. 10, 13 pp. (2005).
Menezes et al, "Handbook of Applied Cryptography," Table of Contents and Chapters 11-13, 177 pp. (1997).
Mink, "Custom Hardware to Eliminate Bottlenecks in QKD Throughput Performance," *Proc. SPIE*, vol. 6780, 6 pp. (Sep. 2007).
MIT Technology Review, "Government Lab Reveals It Has Operated Quantum Internet for Over Two Years," 10 pp. (May 6, 2013).
Mitsubishi Electric Corporation, "Mitsubishi Electric Advance: Cryptography Edition," vol. 100, 29 pp. (Dec. 2002).
Mitsubishi Electric Corporation, "Mitsubishi Electric Advance: Information Security Technology," vol. 126, 27 pp. (Jun. 2009).
Mitsubishi Electric Corporation Press Release, "Mitsubishi, NEC, Tokyo University Realize Successful Interconnection of Quantum Encryption Networks for First Time in Japan," 4 pp. (document marked May 12, 2006).
Mitsubishi Electric, "One-time Pad Mobile Phone Software," 1 pp. (Oct. 2010).
National Institute of Information and Communications Technology Press Release, "Inauguration of the Tokyo QKD Network," 3 pp. (document marked Oct. 14, 2010).
Nordholt et al., "A New Face for Cryptography," Los Alamos Science, No. 27, pp. 68-85 (2002).
Nordholt et al., "Present and Future Free-space Quantum Key Distribution," *Proc. SPIE Free-Space Laser Communication Technologies XIV*, vol. 4635, pp. 116-126 (Apr. 2002).
Peev et al., "The SECOQC Quantum Key Distribution Network in Vienna," *New Journal of Physics*, vol. 11, 37 pp. (Jul. 2009).
Peters et al., "Dense Wavelength Multiplexing of 1550 nm QKD with Strong Classical Channels in Reconfigurable Networking Environments," *New Journal of Physics*, vol. 11, 17 pp. (Apr. 2009).
Quintessence Labs Pty Ltd., "Breakthrough Technology," "Optical Subsystem Module/Card," "Modules of Operation," and "Application Areas," 5 pp. (documents downloaded from the World Wide Web on Sep. 9, 2011).
Rass et al, "Quantum Coin-Flipping-Based Authentication," *IEEE*, 5 pp. (Jun. 2009).
Rosenberg et al., "Long-Distance Decoy-State Quantum Key Distribution in Optical Fiber," *Physical Review Letters*, vol. 98, 4 pp. (Jan. 2007).
Rosenberg et al., "Practical Long-distance Quantum Key Distribution System Using Decoy Levels" *New Journal of Physics*, vol. 11, 10 pp. (Apr. 2009).
Rosenberg et al., "Quantum Key Distribution at Telecom Wavelengths with Noise-free Detectors," 8 pp. (also published as Rosenberg et al., "Quantum Key Distribution at Telecom Wavelengths with Noise-free Detectors," *IEEE Applied Physics Letters*, vol. 88, Issue 2, pp. 21108-1-21108-3 (Jan. 2006)).
Runser et al., "Progress Toward Quantum Communications Networks: Opportunities and Challenges," *Optoelectronic Integrated Circuits IX*, vol. 6476, 15 pp. (Mar. 2007).
Schneider, "A Critical Look at Wireless Power," *IEEE Spectrum*, 10 pp. (May 2010).
SECOQC, "SECOQC White Paper on Quantum Key Distribution and Cryptography," SECOQC-WP-v5, 28 pp. (Jan. 22, 2007).
Shih et al., "New Efficient Three-Party Quantum Key Distribution Protocols," *IEEE Journal of Selected Topics in Quantum Electronics*, 15:6 pp. 1602-1606 (Nov./Dec. 2009).
Toliver et al., "Demonstration of 1550 nm QKD with ROADM-based DWDM Networking and the Impact of Fiber FWM" *Conf. on Lasers and Electro-Optics*, 2 pp. (May 2007).
Toliver et al., "Experimental Investigation of Quantum Key Distribution Through Transparent Optical Switch Elements," *IEEE Photonics Technology Letters*, vol. 15, Issue 11, pp. 1669-1671 (Nov. 2003).
Troiani, "Los Alamos Lab Uses Quantum Physics for Mobile Security," 2 pp., downloaded from http://www.thenewnewinternet.com/2012/01/26/los-alamos-lab-uses-quantum-physics-for-mobile-security/ (Jan. 26, 2012).
Vittorio, "Quantum Cryptography: Privacy Through Uncertainty," ProQuest, 9 pp. (Oct. 2002).
Wegman et al., "New Hash Functions and Their Use in Authentication and Set Equality" *Journal of Computer and System Sciences*, vol. 22, Issue 3, pp. 265-279 (Jun. 1981).
Wikipedia, "Quantum Cryptography," 10 pp. (2010).
Wikipedia, "Key Distribution," 5 pp. (2010).
Wikipedia, "One-time Pad," 12 pp. (2010).
Written Opinion dated Nov. 26, 2012, from International Patent Application No. PCT/US2012/053382, 4 pp.
Yao, "Polarization in Fiber Systems: Squeezing out More Bandwidth," The Photonics Handbook, 5 pp. (2003).

\* cited by examiner

GREAT CIRCLE SOLUTION TO POLARIZATION-BASED QUANTUM COMMUNICATION (QC) IN OPTICAL FIBER

CROSS REFERENCE TO RELATED APPLICATION

This application claims the benefit of U.S. Provisional Application 61/541,666, filed Sep. 30, 2011, which is incorporated herein by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The disclosure pertains to methods and apparatus for establishing a distribution of polarization states, particularly in quantum cryptography.

BACKGROUND

In quantum communication, two parties exchange information encoded in quantum states. Typically, the quantum states are specially defined properties of photons such as pairs of polarization states (e.g., 0° and 90°, or 45° and 135°) or circular basis states (e.g., left-handedness and right-handedness). Through the quantum communication ("QC"), the two parties produce a shared random series of bits known only to them, which can then be used as secret keys in subsequent encryption and decryption of messages.

A third party can, in theory, eavesdrop on the QC between the two parties. Such eavesdropping perturbs the QC, however, introducing anomalies that the two intended parties can detect. Using conventional communication, the two parties post-process the results of the QC to remove any partial information acquired by an eavesdropper, and form shared secret keys from the remaining information resulting from the QC.

For example, according to one general approach to QC, a transmitter sets the quantum state of binary information, makes a record of how it set the quantum state, and transmits the information. Table 1 shows an example of quantum states and bases for different polarizations of photons. For the bases and states shown in Table 1, the transmitter selects a basis (rectilinear, diagonal, or circular), sets the polarization state for a photon in the selected basis, and records the bit value (0 or 1), the selected sending basis and the time of transmission.

TABLE 1

Example bases and quantum states.

| Basis | 0 | 1 |
|---|---|---|
| Rectilinear (+) | 90° | 0° |
| Diagonal (x) | 45° | 135° (or −45°) |
| Circular | Left | Right |

A receiver receives the binary information, measures the quantum state of the information and makes a record of how it measured the quantum state. The measured state depends on how the receiver performs the measurement (e.g., with measuring basis of rectilinear or diagonal). The transmitter and receiver are expected to record different bit values in some instances because the transmitter and receiver at times set/measure the quantum-state-encoded information in different ways. Thus, after exchanging information in quantum states, the transmitter and receiver compare their records of how the quantum states were set and measured. For this comparison, the transmitter and receiver exchange information over a public channel. Then, the transmitter and receiver produce a shared series of bits (keys) from the encoded information for which quantum states were set and measured in the same way by the transmitter and receiver.

If the rectilinear and diagonal bases and states shown in Table 1 are used, the receiver selects a basis (rectilinear or diagonal), measures the polarization state in the selected basis, and records the measured bit value and measuring basis. No possible measuring basis can distinguish all four states, so the receiver essentially guesses either rectilinear or diagonal. If the measuring basis happens to match the sending basis, the receiver should measure the correct bit value. If the measuring basis does not match the sending basis, however, the measured bit value is as likely to be correct as incorrect. For example, if the sending basis is diagonal for the bit value 0 (polarization state of 45°) but the measuring basis is rectilinear, the measured bit values of 0 (90°) and 1 (0°) are equally likely. The transmitter and receiver compare the sending basis and measuring basis for a given photon, and keep the bit value for a photon if the sending basis and measuring basis match.

If an eavesdropper intercepts and measures a photon, the measurement perturbs the quantum state of the photon. The eavesdropper can only guess the original sending basis when it re-encodes and re-transmits the photon to the intended destination. At the time of measurement by the receiver, the eavesdropping is not detected. Instead, for subsets of the bit values for which sending basis and measuring basis are found to match, the transmitter and receiver compare parity values. The parity values should match exactly, if the system is appropriately tuned and free from imperfections in transmission and reception. Eavesdropping introduces noticeable discrepancies in the bit values, which allows the transmitter and receiver to detect the eavesdropping, correct the keys, and establish an upper limit on the eavesdropper's partial information.

An error-free bit string shared by the transmitter and receiver can then be privacy-amplified (e.g., by hashing with a hashing function) to reduce its length. (Or, bits can simply be dropped, but this lacks advantages of privacy amplification.) The final length of the shared bit string can depend on the number of errors detected. Shortening the shared bit string with privacy amplification reduces knowledge an eavesdropper might have to an arbitrarily low level—typically, much less than a single bit.

Unfortunately, practical QC systems, especially those using optical fibers, exhibit increased errors due to difficulties in establishing appropriate states of polarization (SOPs) at a receiver due to fiber birefringence which can be large and variable. In the presence of fiber birefringence, bit error rates increase, and it may be impossible to identify intended polarization states and bases.

SUMMARY

Polarization encoded receivers comprise a first detector pair associated with SOPs in a first basis, each of the detectors associated with a selected SOP of the first basis. A second detector pair is associated with SOPs in a second basis conjugate to the first basis, each of the detectors associated with a selected SOP of the second basis. A polarization modulation system is configured to selectively modulate a received optical flux having SOPs in the first and second bases so as to direct components of the optical flux in each of the SOPs to a corresponding one of the detectors of the first and second detector pairs. In some examples, the polarization bases are selected from (R, L), (H, V), and (D, A). In other examples, the polarization modulation system includes at least a first polarization controller and a second polarization controller, wherein the polarization controllers include a plurality of piezoelectric fiber squeezers.

Polarization encoded receivers comprise a first detector associated with an SOP in a first basis and a second detector associated with an SOP in a second basis conjugate to the first basis. A polarization modulation system is configured to selectively modulate a received optical flux having SOPs in the first and second bases so as to direct corresponding components of the optical flux in each of the first and second SOPs to the corresponding first detector and second detector, respectively. In typical examples, the polarization bases are selected from (R, L), (H, V), and (D, A) bases.

Quantum communication methods comprise receiving a polarization encoded optical data flux associated with at least one orthogonal basis and adjusting a state of polarization of the received flux so as to produce a state of polarization in the orthogonal basis, and decoding the flux by directing the flux in the produced state of polarization to an associated detector. In some examples, the received flux is associated with at least two conjugate orthogonal bases such as a rectilinear basis, a diagonal basis, and a circular basis.

Transmitters comprise a laser configured to produce an optical flux and a polarization modulator configured to modulate the optical flux so as to encode data in at least one orthogonal polarization basis. A polarization control system is configured to transform the modulated optical flux so that the modulated optical flux is delivered to a transmitter output in an output polarization basis different than that associated with the polarization modulation. In some embodiments, a polarization modulation input is coupled to the polarization control system and configured to select the transmitter output basis.

Methods comprise applying a polarization modulation to an optical flux based on an input data stream so as to produce a polarization modulated optical flux associated with states of polarization (SOPs) in at least two orthogonal bases, wherein the orthogonal bases are selected to at least partially compensate transmission birefringence. The polarization modulated optical flux is transmitted to a receiver. In some examples, the orthogonal bases are selected so that a received optical flux has states of polarization in two bases such as a rectilinear, diagonal, or circular bases. In typical examples, the transmission birefringence is associated with propagation in an optical fiber, and the polarization modulation is applied in two conjugate orthogonal bases. In other alternatives, the polarization modulation is applied by modulating the optical flux in initial bases and then applying a polarization modulation so as to produce the states of polarization in at least two bases.

The foregoing and other objects, features, and advantages of the disclosed technology will become more apparent from the following detailed description, which proceeds with reference to the accompanying figures.

DETAILED DESCRIPTION

Figure 1:
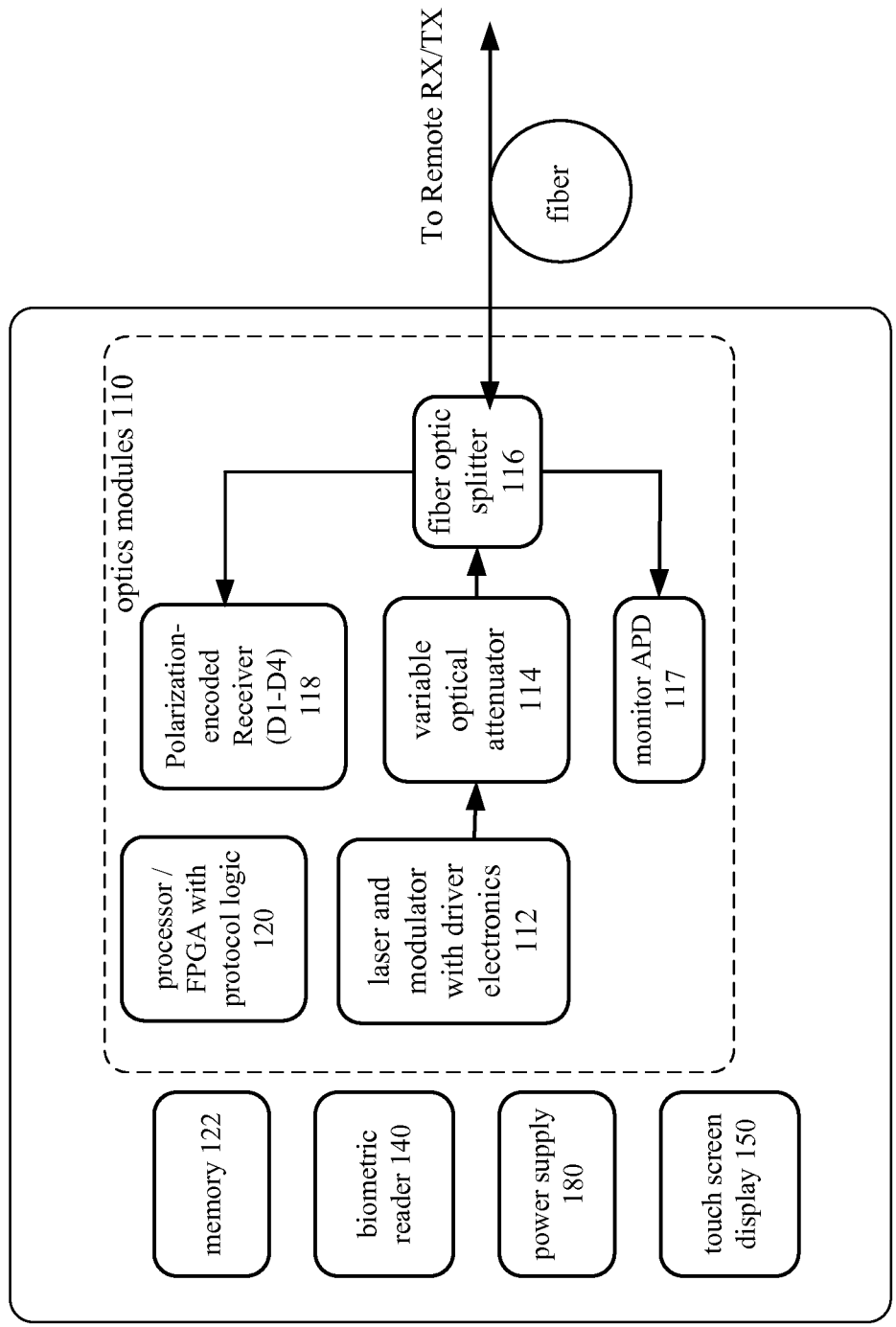
FIG. 1 is a block diagram of a generalized quantum communication (QC) transceiver.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, selected linear states of polarization (SOPs) are referred to as rectilinear up, rectilinear down, diagonal, and antidiagonal with respect to an xyz coordinate system in which a direction of propagation of an optical beam is along a z-axis, rectilinear up and down SOPs are linear orthogonal polarizations that are along a +y-axis and a +x-axis, respectively. For convenience these can be referred to as "H" and "V" polarizations, respectively. Diagonal polarization ("D") and an anti-diagonal polarization ("A") are orthogonal linear polarizations that are oriented along an axis rotated 45 degrees from the +x-axis towards the +y-axis, and oriented along an axis rotated 45 degrees from the +x-axis towards the −y-axis, respectively. Polarization pairs H, V and D, A form respective polarization bases referred to for convenience as a rectilinear basis and a diagonal basis. The rectilinear and diagonal bases are examples of so-called "conjugate bases" in which the measurement of a SOP in a first basis randomizes measurement in a second basis. It will be apparent that the SOPs and polarization bases described above are representative SOPs and bases only, and other SOPs and bases using other linear polarizations, circular polarizations, or elliptical polarizations can be selected. For example, a circular basis consisting of left and right circular polarizations (L, R) can be used. Any particular coordinate system is selected for convenient description, and other coordinates can be used. In the following description, axes and orientations of waveplates (retardation plates or retarders) or other polarization dependent optical components can be described with respect to this same coordinate system.

SOPs can be conveniently described with in a three dimensional coordinate system based on the Poincaré sphere in which linear polarizations are represented by points on a xy-plane, and right-handed circular polarization (RCP) and left-handed circular polarization (LCP) are represented as points situated at a top and bottom (i.e., the poles) of the Poincaré sphere. Other points on the Poincaré sphere represent elliptical polarizations.

As discussed above, QC systems are often based on transmission and detection of polarization modulated optical fluxes having SOPs in two conjugate bases. Such SOPs can be represented on the Poincaré sphere as 4 equidistant points on a great circle. The common basis selections of H, V and D, A corresponds to 4 equidistant points in an equatorial plane; the basis selection H, V and R, L corresponds to 4 equidistant points on a vertical plane that includes poles of the Poincaré sphere. Optical fiber often introduces significant time-varying birefringence, so that a received dual basis modulated optical flux from an optical fiber can include SOPs corresponding to four equidistant points on a great circle on the Poincaré sphere, but different from those at the transmitter. The fiber birefringence rotates the great circle associated with the transmitted polarization bases, but the received SOPs remain spaced apart on a great circle having an arbitrary rotation with respect to the polarization bases.

While QC is typically based on four SOPs from two conjugate orthogonal bases, one SOP from each of the bases is sufficient to define a great circle. For example, an H SOP from an H, V basis and an A SOP from an A, D basis are adequate to define a great circle. In decoding, mapping of one received SOP of a first transmitted basis to a first predetermined detector SOP of a first detector basis is associated with mapping of the second orthogonal received SOP to the second SOP of the first detector basis. In addition, the received SOPs associated with a second basis (a conjugate basis) are similarly mapped to the SOPs of the second basis. With any four SOPs equidistant on a great circle on the Poincaré sphere, a single rotation of suitable magnitude about a suitable axis maps all four SOPs to equidistant SOPs on any great circle. For example, orthogonal SOPs in two conjugate bases can be mapped to L, R or H, V, or A, D bases. In some schemes, three or more orthogonal bases can be used, and these bases can be similarly mapped.

Polarization control and adjustment based on a single SOP of each of two complementary orthogonal bases permits simplified transmitter designs using fewer components. For example, transmitters as disclosed herein are readily manufactured without requiring manual adjustments, can be compact, and simple and quick to set up and operate, with fewer controls, and can provide faster, lower error rate decoding.

Representative QC System Components

As shown in FIG. 1, a representative QC transmitter/receiver includes a plurality of optics modules or optical elements 110 adapted for free space optical communication. The optics modules 110 transmit binary information for which modulation of quantum state is measured (by a QC receiver). The optics modules 110 can also provide a network transceiver adapted to transmit and receive information in a public channel over the optical fiber, transmitting and receiving binary information for which modulation of quantum state is not measured by a QC receiver.

Among the optics modules 110, the laser and modulator with driver electronics 112 include a laser adapted to generate photons for QC transmission and a modulator adapted to modulate quantum state (e.g., polarization state) of output of the laser. The modulator is optically coupled to the laser and can be implemented, for example, with a lithium niobate modulator that modulates polarization state between 0°, 45°, 90° and −45°, typically corresponding to one or more conjugate polarization bases. Alternatively, the modulator is implemented with another kind of integrated-optic or bulk-crystal modulator. The choice of modulator is implementation-specific and can depend, for example, on suitability of the modulator for the specific wavelength of light from the laser, operating frequency of the modulator and/or state purity for the polarization states produced. In some implementations, lasers are provided for each polarization state.

The variable optical attenuator 114 is optically coupled to the laser. The attenuator is adapted to reduce photons per pulse of the laser, which improves security of the QC by foiling eavesdropping attempts that intercept extra photons. The monitor avalanche photodiode ("APD") 117 is split from other modules by the fiber optic splitter 116 and adapted to measure number of photons per pulse from the laser used for QC. For example, the APD 117 is implemented with one or more InGaAs photon detectors. The APD 117 provides feedback used to control the laser and attenuator 114 for QC. Another detector (not shown) receives information as a conventional fiber optic receiver for non-quantum communication.

The processor/field-programmable gate array ("FPGA") with protocol logic 120 controls different operations as part of QC. In particular, the processor/FPGA 120, which is electrically coupled to the module 112, is configured to coordinate operations of the laser and the modulator through driver electronics included with the laser and modulator 112. A random number generator generates a series of random bits for high-quality random numbers. With high-fidelity polarization control, the processor/FPGA 120 controls the polarization of photons with the modulator to encode random bits as different polarization states according to a QC protocol. The processor/FPGA 120 monitors the number of photons per pulse (measured with the APD 117) for the QC. Through control of the laser and variable optical attenuator 114, the processor/FPGA 120 can selectively reduce photons per pulse of the laser to an average level of a single photon per pulse.

The processor/FPGA 120 thus controls the timing and pattern of the single-photon pulses produced by the laser for QC. The processor/FPGA 120 also controls the timing and pulses of higher power pulses (so-called "bright" pulses) produced for synchronization, non-quantum communication and/or other purposes.

For other aspects of the QC protocol, the processor/FPGA 120 controls operations associated with recording the quantum state and sending basis per pulse for the QC, transmitting the recorded sending bases, to, and otherwise processing conventional QC protocol elements. The processor/FPGA 120 can coordinate operations for privacy amplification and decoy states to further improve security. Privacy amplification reduces the length of a shared bit string (e.g., by hashing with a hash function) to reduce partial information that an eavesdropper might have gained. The final length of the string can be set depending on the number of errors detected. For imperfect single-photon sources such as weak laser pulses, decoy states of different average photon numbers (brightness) can be transmitted so that the error rate and number of single photons in a bit string can be determined and used to regulate the degree of privacy amplification.

The memory 122 stores one or more keys. For example, the memory 122 stores quantum keys. In some implementations, the memory 122 is secure memory and keys are stored in encrypted form. The memory 122 can be fabricated along with the integrated optics modules 110 or separately placed.

The biometric reader 140 can be a scanner or other module adapted to accept biometric indicia of a user. For example, the biometric reader 140 can be a fingerprint scanner. The processor/FPGA 120 can include logic for encrypting the biometric indicia with a key stored in the secure memory 122. Or, one or more other encryption modules (not shown) can provide such encryption functionality.

The touch screen display 150 accepts user input (e.g., to a numeric keypad) that can be encrypted along with the biometric indicia as part of user authentication. The touch screen display 150 also displays information to the user (e.g., a count of quantum keys in memory 122, a prompt to contact a trusted authority to make quantum keys, a prompt to initiate secure communication with another, or a prompt for another function) and accepts user input.

Outside of the integrated optics modules 110, most of the functional modules can be implemented with standard components for portable or non-portable devices. Among the integrated optics modules 110, many of the modules (e.g., attenuator 114), monitor APD 117, splitter 116 and polarization encoded receiver 118 can be implemented with standard components for fiber optic or bulk optical communication. Other functional modules (e.g., FPGA) can be implemented with control components that have been used with conventional QC transmitters to: (1) produce specific polarization states with a fiber-optic modulator; (2) regulate production of precisely timed QC and bright pulses in a known pattern disciplined with GPS 190 and an oscillator or atomic clock, for the trusted authority to track timing and time variations when performing QC; (3) monitor average photon number per pulse using the timing system and APD 117; (4) control APD bias, gating, and discriminator electronics; (5) process conventional QC protocol control elements, e.g., to track, correct and exchange polarization state information. The receiver 118 is configured to deliver bits encoded as a particular state of polarization to a corresponding detector. For QC using two conjugate bases, four detectors D1-D4 are provided.

Representative Polarization Encoding Transmitters/Receivers

In typical examples, receiver/transmitter units are configured to both send and receive data, but representative receivers and transmitters are described separately below for convenient illustration. In some examples, quantum transmission is one-way, and a quantum transmitter (and no quantum receiver) is configured to transmit to a remote quantum receiver without a quantum transmitter. While bulk optical elements are shown in some examples, fiber-based optics can be used such as fiber optic power splitters and external lenses and bulk components are unnecessary.

Figure 2:
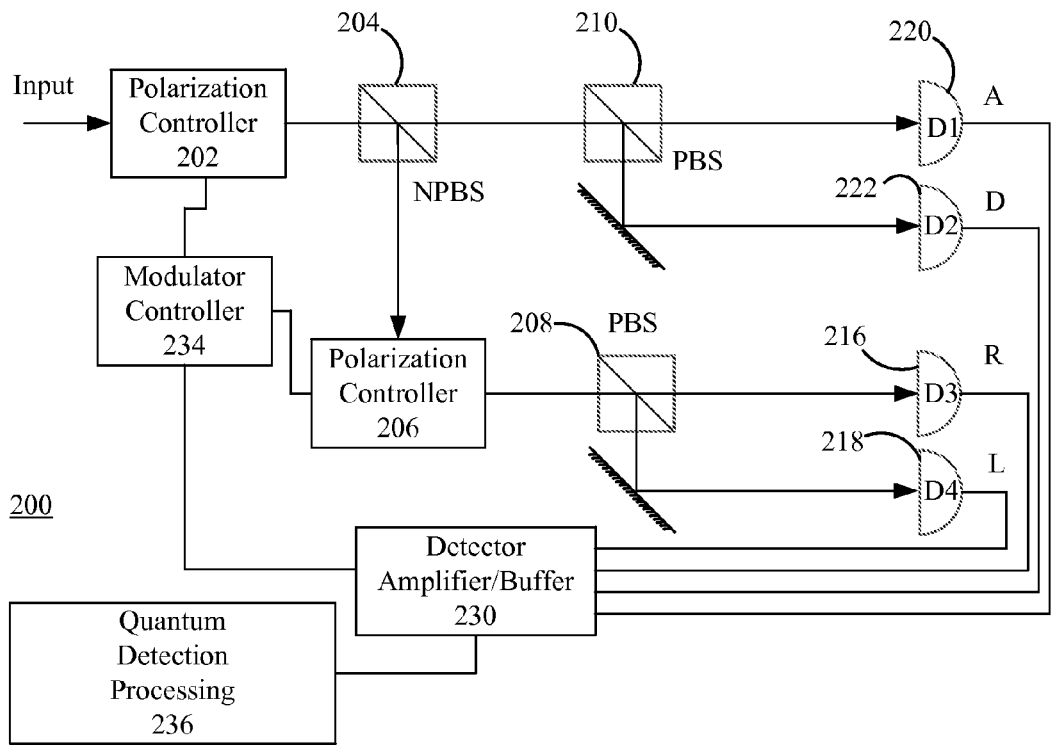
FIG. 2 is a block diagram of an example implementation of a polarization encoded receiver.

A representative polarization encoded receiver 200 that separates polarization states from D, A and R, L bases (or other bases) is illustrated in FIG. 2. A first polarization controller 202 is situated to receive a polarization encoded input optical flux and direct a modulated optical flux to a non-polarizing beam splitter (NPBS) 204. The polarization controller 202 can be implemented as a series of piezoelectric squeezers alternatingly situated at 0 and 45 degrees along a length of optical fiber. Generally at least three or four squeezers are provided, so that variable phase delays along alternating axes can be provided. Such a device can convert any SOP into any other SOP depending on input control voltages. A first portion of the modulated, encoded flux is directed to a second polarization controller 206 and first polarizing beam splitter (PBS) 208. The PBS 208 transmits a component of the optical flux in a linear state of polarization to a detector 216 (D3) and a component in an orthogonal linear SOP to a detector 218 (D4), with the components shown in FIG. 2 as SOPs R, L, respectively. A second portion of the encoded, modulated flux is directed from the NPBS 204 to a second PBS 210 so that orthogonal linear components of the encoded, modulated flux are directed to detectors 220, 221 (D1, D2), with the components shown in FIG. 2 as A, D SOPs, respectively.

A detector amplifier/buffer is coupled to the detectors D1-D4 and to a modulator controller 234 and a quantum detection processor 236. The modulator controller 234 is configured to establish suitable modulations so that each of the detectors D1-D4 receives a selected polarization state from one of two bases. For example, D1 and D2 are coupled to receive linear (A, D) SOPs, and D3 and D4 are coupled to receive circular (R, L) SOPs. In typical examples, QC detection uses an additional set of four detectors and associated polarization control components, but these are not shown in FIG. 2. Polarization modulators can be waveguide devices, bulk electro-optic modulators, or piezo-electric based polarization controllers. Birefringence changes in optical fibers are slow enough in some cases that high speed polarization modulation is not required, but polarization modulation bandwidth at a receiver tends to be implementation dependent. The receiver of FIG. 2 is based on two predetermined polarization bases.

The receiver 200 of FIG. 2 can be operated as follows, in which QC time periods alternate with calibration periods in which higher power optical fluxes ("bright" fluxes) are used. In one example, the receiver 202 is configured to direct components of an input optical flux in A, D, R, L SOPs (using diagonal and circular bases) to detectors D1, D2, D3, D4, respectively. In response to a "bright" optical flux in a first SOP, for example, an A SOP, the polarization controller 202 is adjusted by the modulator controller to substantially maximize the optical flux received at the detector D1. In response to a "bright" optical flux in a D SOP with the same modulation applied by the polarization controller 202, the optical flux at detector D1 is substantially minimized and the optical flux at detector D2 is substantially maximized. With this adjustment of the modulator 202, the A, D polarization states can be appropriately decoded. In response to a "bright" optical flux in an SOP of the second basis such as an R SOP, the polarization controller 206 is adjusted (with the polarization controller 202 set as described above) so that the optical flux at detector D3 is maximized. With the modulations of at the polarization controllers 202, 206 fixed, each of the detectors D1-D4 receives optical flux portions in predetermined SOPs. It will be appreciated that an A SOP is directed to detector D1 at the same control setting as the D SOP is directed to the detector D2 because the transmitted polarizations remain oppositely situated on a great circle on the Poincaré sphere regardless of any birefringence along the path between the transmitter and receiver. Any rotation on the Poincaré sphere that returns the transmitted A modulation to an A modulation at the detector returns the D modulated optical flux to the D SOP. Similarly, adjusting a controller so that the transmitted R SOP is directed to a detector D3 necessarily directs the transmitted L SOP to detector D4 as these SOPs are oppositely situated on the Poincaré sphere.

Figure 3:
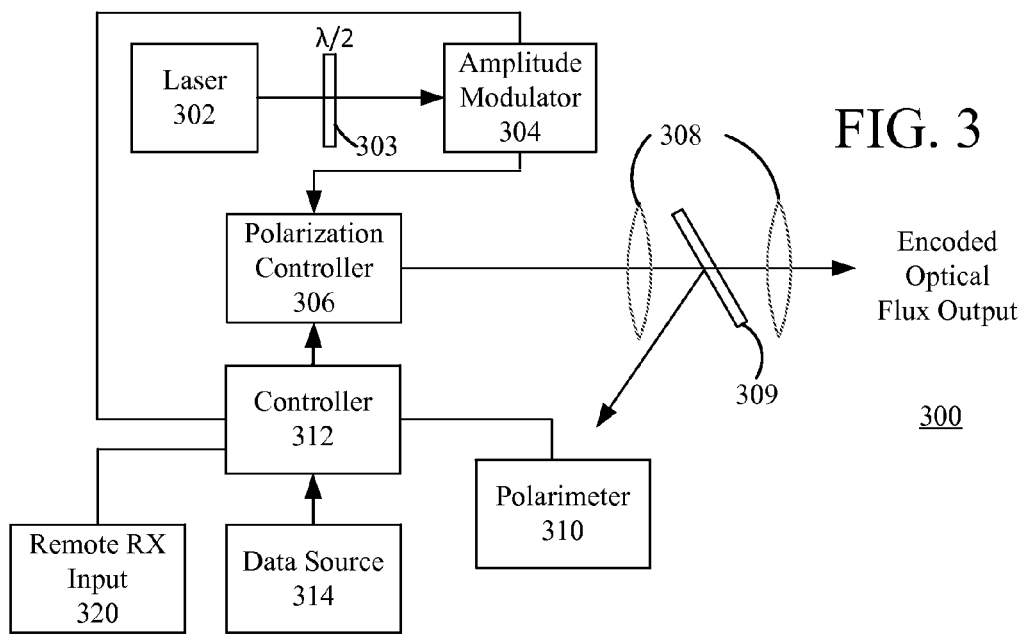
FIG. 3 is a block diagram of a representative polarization encoding transmitter.

With reference to FIG. 3, a polarization encoding transmitter 300 includes a laser 302 that produces an optical flux that is directed to an amplitude modulator 304 and a polarization controller 306 through a half-wave retarder 303. If a full polarization controller is used, this retarder can be omitted. The amplitude modulator 304 is configured so as to control a number of photons per bit in QC to be a predetermined number of photons, typically a number between one and five, by attenuating the laser optical flux. In addition, the amplitude modulator 304 is configured to provide substantially less attenuation in transmission of so-called "bright bursts" for use at a receiver in correcting polarization changes in propagation. Quantum polarization modulation is applied to the optical flux by a polarization controller 306 and the modulated flux is directed to output optics 308 for coupling to an optical fiber or other transmission medium. A portion of the optical flux is directed by a reflector 309 to a polarimeter 310 that is configured to determine one or more SOPs in the optical flux. A controller 312 is coupled to the polarization modular 306, the amplitude modulator 304, and the polarimeter 310 so as to adjust polarization modulation to correspond to the selected bases. In addition, the controller 312 can adjust the amplitude modulator 304, as well as receive and buffer data that is to be transmitted from a data source 314. While the polarization controller 306 can be implemented in various ways, for high speed polarization encoding a waveguide TE/TM convertor such as a LiNbO$_3$ device can be used. The retarder 303 is adjusted to provide approximately equal TE and TM polarizations at the polarization modulator 306, and the controller can vary an applied voltage so that the output SOP is varied along a great circle on the Poincaré sphere that passes through the poles. If desired, a polarization modulator can be used that permits mapping any input SOP to any output SOP and the retarder 303 would become unnecessary. Voltages corresponding to A, D, R, L SOPs are used for data modulation. In some cases, an input 320 is provided so that a remote receiver can specify suitable polarization bases for modulation at the transmitter 300 so that the received optical flux is in bases defined at the receiver.

Figure 4:
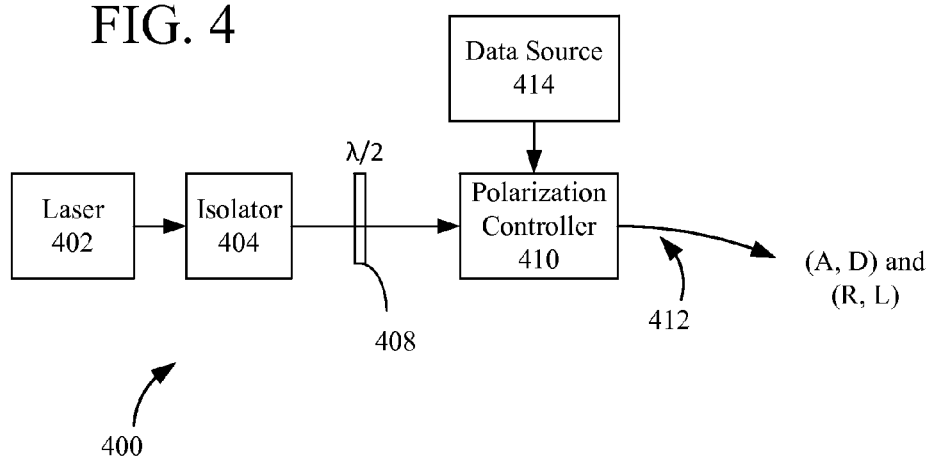
FIG. 4 is a block diagram of an example implementation of a QC transmitter.

Referring to FIG. 4, a fiber coupled transmitter 400 includes a laser 402 that directs an optical flux to an isolator 404 and a half-wave retarder 408. A phase modulator 410 receives the optical flux from the retarder 408 and directs a polarization modulated flux into a fiber 412 based on data from a data source 414. The phase modulator 410 serves as a voltage variable retarder, with a fixed axis and can be provided as an integrated optic LiNbO$_3$ waveguide device that produces voltage dependent phase differences on TE and TM polarizations. The phase modulator 410 is configured to modulate an input optical flux so as to provide a polarization encoded output in any of four SOPs of two conjugate bases, an (A,D) basis and an (R, L) basis as shown in FIG. 4. Typically, modulator drive voltages needed to produce the selected SOPs are determined in a calibration procedure in which the modulator drive voltage is varied while the resulting SOP is evaluated with a polarimeter. For a fiber-coupled output, the output SOP of the modulator is measured after some birefringence is introduced by the intervening fiber. The retarder is configured correctly for the system with a single phase modulator when scanning the phase modulator produces a great circle on the Poincaré sphere. Four equally spaced SOPs on the great circle can then be chosen for two conjugate orthogonal bases.

Figure 5:
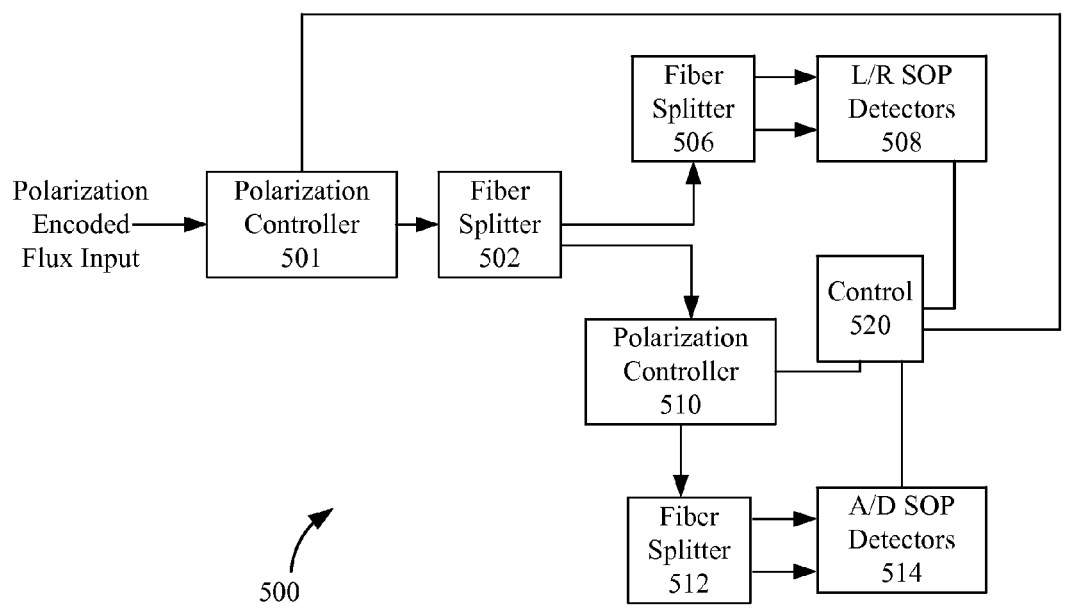
FIG. 5 is a block diagram of an example fiber implementation of a polarization encoded receiver.

With reference to FIG. 5, a polarization receiver 500 includes a first polarization controller 501 such as an integrated optical modulator that is connected to a fiber coupler 502. The fiber coupler 502 is polarization independent and directs a portion of the received optical flux to a polarization dependent fiber coupler 506 that delivers orthogonal polarization components to corresponding L, R SOP detectors in detector module 508. The fiber coupler 502 also directs a portion of the received optical flux to a polarization controller 510 and a polarization dependent fiber coupler 512 that delivers orthogonal polarization components to corresponding D, A SOP detectors in detector module 514. A controller 520 provides suitable drive voltages for the polarization controllers 501, 510. When adjusted appropriately, an L SOP is received at a corresponding L detector, not received at an R detector, and received at ½ amplitude (equally) at A, D detectors. Other SOPs are similarly directed. Generally, a first SOP in a first basis is directed preferentially to a detector associated with the first SOP and the first basis, and not to a detector associated with a second SOP in the first basis. This first SOP of the first basis is directed equally to detectors associated with the second basis.

In the examples above, the receiver includes four detectors (one for each SOP of two conjugate bases), but only one detector for each basis is required. For example, if a modulation is applied so that a linear SOP such as an H SOP is directed to a first detector, a V SOP is generally necessarily directed so as to be available to a second detector that need not be supplied. In addition, while polarization correction can be applied at a receiver as shown above, similar polarization corrections can be provided at a transmitter, or distributed between transmitter and receiver.

Figure 6:
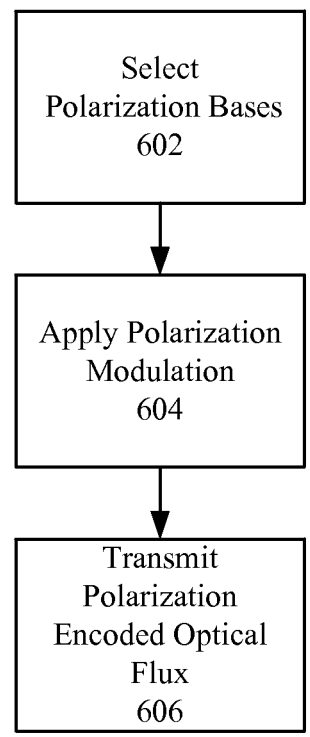
FIG. 6 is a block diagram of a representative transmitter side method.

A representative transmitter side method is illustrated in FIG. 6. At 602, one or more conjugate polarization bases are selected so as to compensate measured or expected birefringence in transmission. At 604, an optical flux is modulated (encoded) with respect to these bases, and at 606, the modulated optical flux is transmitted. In some examples, the bases are selected so that after transmission, the polarization modulated flux is in one or more of a rectilinear basis, a diagonal basis, or a circular basis.

In view of the many possible embodiments to which the principles of the disclosed technology may be applied, it should be recognized that the illustrated embodiments are only preferred examples and should not be taken as limiting. We claim as our invention all that comes within the scope and spirit of the appended claims.

We claim:
1. A polarization encoded receiver, comprising:
    a first detector pair associated with SOPs in a first basis, each of the detectors of the first detector pair being associated with a selected SOP of the first basis;
    a second detector pair associated with SOPs in a second basis conjugate to the first basis, each of the detectors of the second detector pair being associated with a selected SOP of the second basis;
    a first polarization controller configured to selectively adjust a received optical flux having SOPs in two bases into a first adjusted optical flux, wherein components of the first adjusted optical flux have SOPs in the first basis; and
    a second polarization controller configured to further adjust at least a portion of the first adjusted optical flux from the first polarization controller into a second adjusted optical flux, wherein components of the second adjusted optical flux have SOPs in the second basis.
2. The receiver of claim 1, wherein the polarization bases are selected from (R, L), (H, V), and (D, A).

3. The receiver of claim 1, wherein the first polarization controller and the second polarization controller include a plurality of piezoelectric fiber squeezers.

4. A polarization encoded receiver, comprising:
a first detector associated with an SOP in a first basis;
a second detector associated with an SOP in a second basis conjugate to the first basis; and
a first polarization controller configured to selectively adjust a received optical flux having SOPs in two bases into a first adjusted optical flux, wherein components of the first adjusted optical flux have an SOP in the first basis; and
a second polarization controller configured to further adjust at least a portion of the first adjusted optical flux from the first polarization controller into a second adjusted optical flux, wherein components of the second adjusted optical flux have an SOP in the second basis.

5. The receiver of claim 4, wherein the polarization bases are selected from (R, L), (H, V), and (D, A).

6. The receiver of claim 4, wherein the first polarization controller and the second polarization controller include a plurality of piezoelectric fiber squeezers.

7. A quantum communication method, comprising:
receiving a polarization encoded optical data flux associated with at least two orthogonal bases;
adjusting, at a first polarization controller, the received flux into a first adjusted optical flux, wherein components of the first adjusted optical flux have SOPs in a first pre-determined basis;
further adjusting, at a second polarization controller, at least a portion of the first adjusted optical flux into a second adjusted optical flux, wherein components of the second adjusted optical flux have SOPs in a second pre-determined basis;
directing the first adjusted optical flux to a first detector associated with an SOP in the first pre-determined basis; and
directing the second adjusted optical flux to a second detector associated with an SOP in the second pre-determined basis.

8. The method of claim 7, wherein the first pre-determined basis is conjugate to the second pre-determined basis.

9. The method of claim 8, wherein the first pre-determined basis and the second pre-determined basis include at least two of a rectilinear basis, a diagonal basis, and a circular basis.

10. A transmitter, comprising:
a laser configured to produce an optical flux;
a polarization modulator configured to modulate the optical flux so as to encode data in at least two orthogonal polarization bases; and
a polarization control system configured to adjust the modulated optical flux into an adjusted optical flux based on input received from a remote receiver so that the adjusted optical flux has polarization bases different than those associated with the optical flux.

11. The transmitter of claim 10, wherein the adjusted optical flux is delivered to a remote receiver such that the remote receiver receives the adjusted optical flux in bases defined at the remote receiver.

12. A method, comprising:
applying, at a transmitter, a polarization modulation to an optical flux based on an input data stream from a remote receiver so as to produce a polarization modulated optical flux associated with states of polarization (SOPs) in at least two orthogonal bases, wherein the orthogonal bases are selected to at least partially compensate for transmission birefringence; and
transmitting the polarization modulated optical flux.

13. The method of claim 12, wherein the orthogonal basis is selected so that a received optical flux has states of polarization in one of a rectilinear, diagonal, or circular basis.

14. The method of claim 12, wherein the transmission birefringence is associated with propagation in an optical fiber.

15. The method of claim 12, wherein the polarization modulation is applied in three orthogonal bases that correspond to four equidistant SOPs on a great circle on the Poincaré sphere and two intersections of an axis of the great circle and the Poincaré sphere.

16. The method of claim 12, wherein the polarization modulation is applied by modulating the optical flux in initial bases and then applying a polarization adjustment so as to produce the states of polarization in at least two bases.

17. A method, comprising:
receiving a polarization encoded optical flux associated with polarization modulation in at least four states of polarization (SOPs), wherein the received SOPs can be represented as equidistant points on a great circle of the Poincaré sphere that is different from a great circle associated with SOPs of a polarization encoding applied at a transmitter; and
polarization compensating the received optical flux to effectively transform the received SOPs so that the great circle associated with the received SOPs corresponds to a great circle, wherein the transformed SOPs are different from the SOPs applied at a transmitter.

18. The method of claim 17, wherein the polarization encoding at the transmitter is based on two orthogonal bases, and the polarization compensating maps the received SOPs so as to correspond to the SOPs of the polarization encoding at the transmitter.

* * * * *